United States Patent

[11] 3,612,836

[72] Inventors Robert J. Jordan
 Lexington Park;
 William P. Russell, Leonardtown; Robert
 R. Shatzer, Lexington Park, all of Md.
[21] Appl. No. 13,636
[22] Filed Feb. 24, 1970
[45] Patented Oct. 12, 1971
[73] Assignee The United States of America as
 represented by the Secretary of the Navy

[54] DIGITAL END SPEED INDICATOR
 10 Claims, 1 Drawing Fig.
[52] U.S. Cl. .................................................... 235/92 FQ,
 235/92 R, 235/92 EA, 73/489
[51] Int. Cl. ....................................................... G06f 7/38,
 G06g 7/00
[50] Field of Search .......................................... 235/29, 29
 A, 65, 92; 324/160, 178; 73/147

[56] References Cited
UNITED STATES PATENTS
3,497,683  2/1970  Jordan et al. .................  235/92
3,348,559  10/1967  Brothman et al. ............  73/489 X Primary Examiner—Maynard R. Wilbur
Assistant Examiner—Joseph M. Thesz, Jr.
Attorneys—R. S. Sciascia and Thomas O. Watson, Jr.

ABSTRACT: An aircraft catapult launch monitoring system that combines the functions of digitally determining the end speed of the aircraft, determining catapult accumulator pressure and valve opening time and distance. The accumulator pressure is measured by a digital pressure transducer. Valve-opening time is measured by a device that determines the time an angle encoder takes to register the count analogous to the distance opened. Valve-opening length is measured by counting the pulses generated by the angle encoder and translating them to an analogous length.

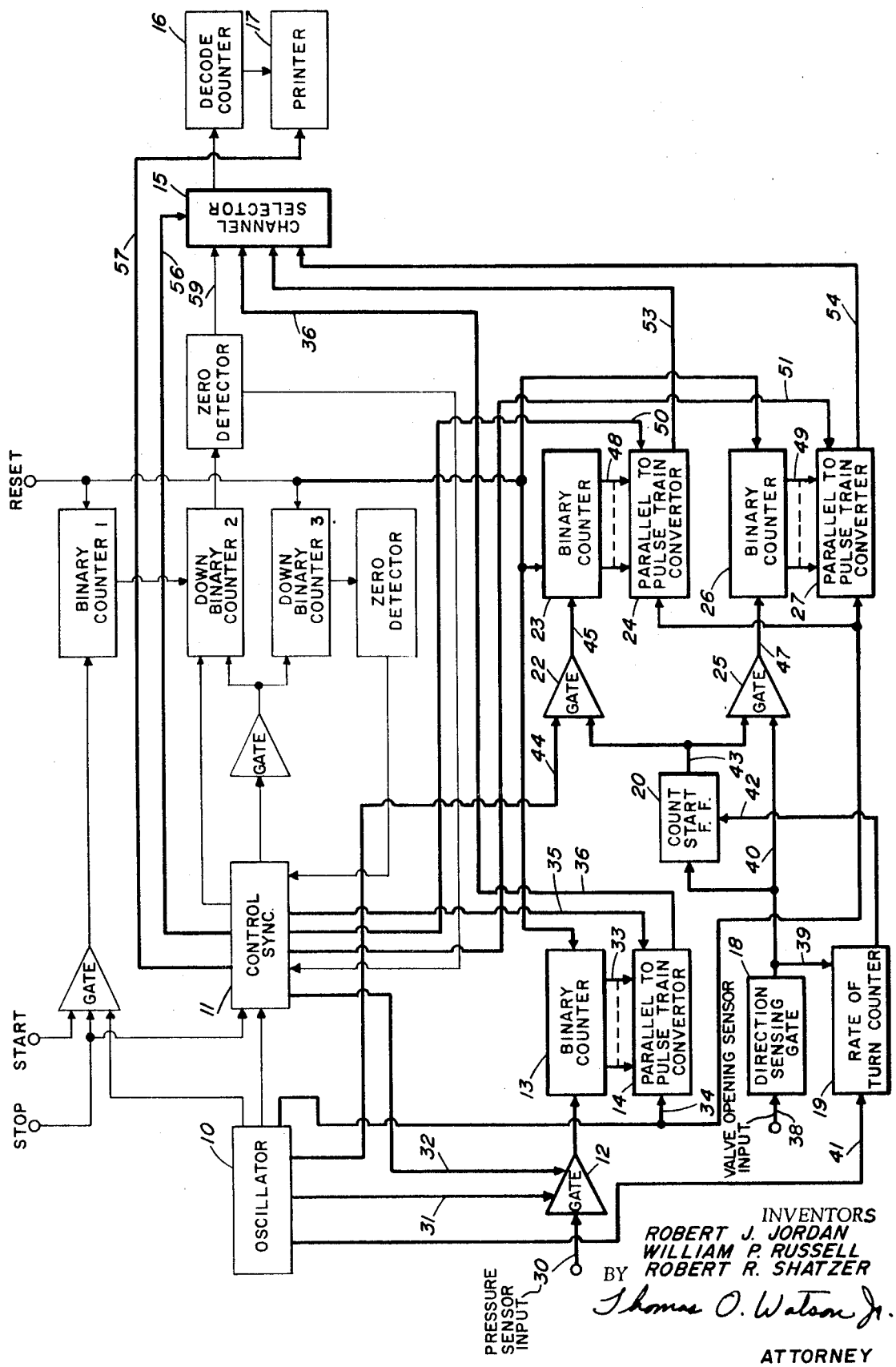

DIGITAL END SPEED INDICATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention pertains to catapult-monitoring systems and more specifically to catapult-monitoring systems that measure and compute catapult end speed, measure catapult accumulator pressure, and measure catapult valve opening time and distance.

Prior art catapult-monitoring devices only performed the function of measuring the end speed of the catapult during a launch operation. Such devices consisted of synchronous chronographs in which the end speed was determined by measuring the distance between marks on the synchronous paper of the chronograph. The obvious disadvantages of this type of system are that it takes a considerable length of time to make the measurement and the accuracy of the speed indication obtained is limited by the manner in which the distance between the marks is measured. A prior art device which obviated the above disadvantages by performing the measurements and calculations required electronically is described in application Ser. No. 560,962 entitled "Catapult Digital End Speed Indicator," filed June 24, 1966, now Pat. No. 3,492,683 and assigned to the assignee of this invention. This catapult digital end speed indicator functions satisfactorily but is limited to the single function of measuring the end speed.

SUMMARY OF THE INVENTION

The instant invention combines into one system the functions of measuring catapult end speed, catapult accumulator pressure and catapult valve opening time and distance. Accumulator pressure measuring apparatus and valve opening time and distance measuring apparatus was combined with the end speed measuring apparatus of U.S. Pat. No. 3,497,683 by modifying the end speed indicating and measuring apparatus so as to accommodate the pressure measuring and valve opening time and distance measuring functions in its master control circuitry.

Accumulator pressure is measured by means of a pressure transducer that puts out a pulse train which varies its output frequency proportionally to the pressure applied to the transducer input. The pulse train is applied to a gate which is only opened for 0.01 seconds by means of the master control and synchronizing circuitry of the system. During the time the gate is opened, the pressure transducer generated pulses are counted by a binary counter. The counter thus records, by means of the number of pulses, the pounds per square inch being applied to the pressure transducer. Upon command from the master control and synchronizing circuit, the pulse train count is shifted from the counter into a printout mechanism where it is recorded.

The valve time and distance measurement is accomplished by means of a disc encoder mounted on the launch valve of a catapult. The encoder puts out a certain number of pulses for each inch of travel of the valve. Binary counters receive and store these pulses in a manner representative of the length of time taken by the valve to reach its open position and of the distance traveled by the valve. Upon command from the master control and synchronizing circuit, the binary counters transfer their pulse indications to the printout apparatus where they are recorded as time taken and distance traveled. The master control and synchronizing circuit initiates the operation of the three measuring functions and also initiates the readout of the variables measured.

OBJECTS OF THE INVENTION

An object of this invention is to provide a system for measuring catapult end speed, accumulator pressure and valve opening time and distance when an airplane is launched.

Another object of this invention is to provide a compact, accurate and fast system for measuring, calculating, recording, and displaying end speed, accumulator pressure, and valve opening time and distance of a catapult when launching an aircraft.

Other objects, advantages and novel features of the invention will become apparent from the following detailed description of the invention when considered in conjunction with the accompanying drawing.

BRIEF DESCRIPTION OF THE DRAWING

The FIGURE represents the entire catapult-monitoring system of the invention. The lightly drawn portion of the FIGURE being the system described in U.S. Pat. No. 3,497,683 and the darkly drawn portion representing the improvements and additions thereto.

DESCRIPTION OF THE PREFERRED EMBODIMENT

Referring to the FIGURE, the lightly drawn block diagram, which is representative of the apparatus of U.S. Pat. No. 3,497,683, was modified by changing oscillator 10 to output 2 kilohertz and 100 hertz as well as the 100 kilohertz which was previously used. The master control and synchronous circuit 11 was changed to incorporate control functions for printer 17, channel selector 15, pressure gate 12 and the parallel to pulse train converters 14, 24, and 27. The function and operation of the system represented by the lightly drawn portion of the FIGURE otherwise remains the same as described in U.S. Pat. No. 3,497,683.

The darkly drawn portion of the FIGURE which represents additional circuitry added to accomplish the additional functions of accumulator pressure measurement and valve time and distance measurement will now be explained.

PRESSURE MEASUREMENT

After a launch signal from the catapult sets master control and synchronizing circuit 11, circuit 11 sends a signal by means of control lines 32 to gate 12 causing it to open. Gate 12 is timed by oscillator 10, over timing line 31, to stay open for 0.01 seconds. During the time that gate 12 is open, the pressure transducer which measures the accumulator pressure has its generated pulses passed through gate 12 to binary counter 13 by means of pulse line 30.

The pressure transducer used in this invention is well known in the art and is the type that puts out a pulse train proportional in frequency to the pressure in pounds per square inch applied to the transducer. For example: at 0 p.s.i. the frequency output of the transducer is zero cycles per second; at 500 p.s.i. the pulse frequency output is 50,000 cycles per second; at 1,000 p.s.i. the pulse frequency output is 100,000 cycles per second. Therefore, assuming for example, that the pressure applied to the transducer is 400 p.s.i., the gate which is opened for only 0.01 seconds would allow 400 pulses to pass into binary counter 13.

Binary counter 13, as is well known in the art, is capable of counting and storing the required number of pulses, as determined by the operative pressure range employed. Binary counter 13 indicates the pressure being measured by means of the quantity of pulses counted.

After the end speed calculation and measurement has been performed by the circuitry drawn in light lines, as explained in U.S. Pat. No. 3,497,683, and such end speed has been printed by printer 17 as controlled by control circuit 11 over control lines 56 and 57, control circuit 11 sends a signal over control line 35 to parallel pulse train converter 14 causing the pulses in binary counter 13 to be transferred by means of parallel transfer lines 33 to parallel to pulse train converter 14. Parallel to pulse train converter 14 will then transmit, the pulses transferred from counter 13, in a serial manner by means of line 36 to and through channel selector 15 to decade counter 16 which stores the pulses received until all the pulses transferred from binary counter 13 have been transmitted. Upon the receipt by decade counter 16 of the entire pulse train, it is transferred to printer 17 wherein a corresponding pressure measurement is printed as a permanent record.

The pulse train transmitted by parallel to pulse train converter 14 over pulse train line 36 travels through channel selector 15 because control circuit 11, in a well-known manner, by means of control line 56, connects pulse train line 36 with the path leading to decade counter 16.

Printer 17, therefore, has now recorded the catapult end speed and the accumulator pressure.

VALVE OPENING TIME AND DISTANCE MEASUREMENT

The valve opening time and distance measurement is accomplished by using a disc encoder, not shown, mounted on the launch valve of the catapult. The type of encoder used is well known in the art and puts out 100 pulses for every inch of travel of the valve.

A direction sensing gate 18 which receives over pulse line 38 the pulses put out by the disc encoder senses whether the valve is opening or closing by allowing pulses representative of a valve-opening motion to pass while prohibiting pulses representative of a valve-closing motion. When the valve starts to open the first pulse passes through direction sensing gate 18, sets count start flip-flop 20 and presets rate of turn counter 19 over paths 40 and 39 respectively.

Rate of turn counter 19 is preset over path 39 every time a pulse passes through direction sensing gate 18. If the number of pulses received by rate of turn counter 19 over path 39 within a certain time period is representative of a no movement condition of the valve as determined by comparing pulses received from oscillator 10 over pulse line 41 with pulses received over line 39, then, rate of turn counter 19 generates a signal over control line 42 which resets count start flip-flop 20 to the "off" condition. Thus, it can be seen that when the valve starts to open, the output of oscillator 10 by means of pulse line 44 is passed through gate 22 whenever count start flip-flop 20 is in its "on" state and the disc encoder connected to the valve is sending pulses through count start flip-flop 20 to gate 22 by means of pulse line 43.

The output of gate 22 on pulse line 45 consists of pulses representing time increments which are counted and stored in binary counter 23. When the valve motion stops, gate 22 will no longer pass pulses received on line 44 because count start flip-flop 20 has been reset to the off state by rate of turn counter 19. The pulse count accumulated in binary counter 23 therefore represents the time it took the valve to open.

When count start flip-flop 20 is set in its on state by the first pulse received through direction sensing gate 18, gate 25 passes the pulses received from the disc encoder. These pulses travel over pulse line 47 and are registered in binary counter 26. Gate 25 inhibits the passing of pulses received at pulse line 40 at the same time that gate 22 inhibits pulses received at pulse line 44 because count start flip-flop 20 which is reset to its off state by rate of turn counter 19 controls both gate 22 and 25. Binary counter 26 thus contains a count which indicates the distance the valve has opened because each count is representative of an incremental length.

After printer 17 has printed the pressure measurement, master control circuit 11 sends a control pulse to parallel to pulse train converter 24 over control line 50, causing the information stored in binary counter 23 to be transferred, in a parallel manner, to parallel to pulse train converter 24 and serially transmitted over pulse line 53 through channel selector 15 to decade counter 16. Upon all the information being received in decade counter 16, a valve-opening time is printed out in printer 17.

After the valve time is thus printed, an identical operation occurs for readout of the valve distance traveled. Thus control circuit 11 transmits a pulse command signal over line 51 to parallel to pulse train converter 26 causing binary counter 26 to transfer in a parallel fashion over lines 49 the information therein contained. Parallel to pulse train converter 27 will then in a serial manner transfer the pulses indicative of distance traveled over pulse line 54 through channel selector 15 to decade counter 16 and thereafter to printer 17.

Oscillator 10 sends a clock pulse by way of line 34 to every parallel to pulse train converter in the system to facilitate synchronization of the system functions. As was mentioned previously control and synchronization circuit 11 selects the appropriate channel selector inputs 59, 36, 53 or 54 to be connected to decade counter 16 at the appropriate time. Thereafter printer 17 will print out the data contained in decade counter 16 when decade counter 16 contains all the information that was transferred to it. After recording the valve distance travelled the unit has completed its operation for one catapult launch and may be reset by means of the reset button which is appropriately labeled in the drawing.

Obviously many modifications and variations of the present invention are possible in the light of the above teachings.

What is claimed is:

1. A system for measuring and computing catapult end speed, measuring catapult accumulator pressure, and measuring catapult valve opening time and distance comprising:

an end speed sensor; and a pressure sensor; and a valve opening time and distance sensor; and an end speed measuring and computing means responsive to signals received from said end speed sensor to measure and compute catapult end speed; and a pressure-measuring means responsive to signals received from said pressure sensor to measure accumulator pressure; and a valve opening time and distance measuring means responsive to said valve opening time and distance sensor to measure catapult valve opening time and distance; and an indicating means responsive to said end speed measuring and computing means, said pressure-measuring means and said valve opening time and distance measuring means to indicate the degree of the respective received signal; and a control and synchronizing means for regulating the sequence of operation of said end speed measuring and computing means said pressure-measuring means, and said valve opening time and distance measuring means.

2. The system of claim 1 wherein said pressure sensor comprises a pressure transducer which produces at its output, a pulse train proportional in frequency to the pressure applied at its input.

3. The system of claim 2 wherein said pressure-measuring means comprises:

a gate, responsive to said pressure transducer, held open for a predetermined time interval so that the pulses passed through said gate equal in quantity the number of lbs./in.$^2$ applied to said transducer; and a counter means, responsive to said gate passing pulses, for counting the pulses passed through said gate; whereby the number of pulses counted represent the number of lbs./in.$^2$ that said pressure sensor detected.

4. The system of claim 3 wherein said control and synchronizing means controls the time interval that said gate is held open, instructs said counter to transmit its accumulated pulses, and instructs said indicating means to indicate a pressure in response to pulses received from said counter.

5. The system of claim 1 wherein said valve opening time and distance sensor comprises a disc encoder.

6. The system of claim 5 wherein said valve opening time and distance measuring means comprises:

a direction-sensing gate responsive to pulses received from said disc encoder which passes pulses caused by valve opening and inhibits pulse caused by valve closing; and a rate of turn counter responsive to pulses received from said direction sensing gate for generating an off signal whenever the pulse rate received from said gate is below a level predetermined to be indicative of no valve movement; and a switch means having an on and off state responsive to the off signal generated by said rate of turn counter; and a counter means connected to said switch means and responsive to pulses received from said disc encoder through said switch means when said switch is in its on state, to count pulses indicative of a valve opening time and distance.

7. The system of claim 6 wherein said counter means comprises first and second counter means, said first and second counter means responsive to pulses received from said encoder, said first counter means counting pulses that represent the length of time taken for a valve to open, and said second counter means counting pulses that represent the distance travelled by a valve while it was opening.

8. The system of claim 7 wherein said control and synchronizing means instructs said first counter means to transmit its accumulated pulses and instructs said indicating means to indicate a valve opening time in response to pulses received from said first counter means.

9. The system of claim 7 wherein said control and synchronizing means instructs said second counter means to transmit its accumulated pulses and instructs said indicating means to indicate a valve opening distance in response to pulses received from said counter means.

10. The system of claim 7 wherein said control and synchronizing means instructs said first and second counter means to transmit its accumulated pulses and instructs said indicating means to indicate a valve-opening time in response to pulses received from said first counter means and indicate a valve-opening distance in response to pulses received from said second counter means.